United States Patent
Charcenko et al.

(10) Patent No.: US 9,127,785 B2
(45) Date of Patent: Sep. 8, 2015

(54) FEED-THROUGH DEVICE

(71) Applicant: Lapp Engineering & Co., Cham (CH)

(72) Inventors: Valerij Charcenko, Kromeriz (CZ); Marek Jurak, Zlin (CZ)

(73) Assignee: Lapp Engineering & Co., Cham (CH)

( * ) Notice: Subject to any disclaimer, the term of this patent is extended or adjusted under 35 U.S.C. 154(b) by 36 days.

(21) Appl. No.: 14/078,620

(22) Filed: Nov. 13, 2013

(65) Prior Publication Data

US 2014/0145436 A1    May 29, 2014

(30) Foreign Application Priority Data

Nov. 26, 2012  (EP) .................................. 12194316

(51) Int. Cl.
  *H01R 9/05*    (2006.01)
  *F16L 5/06*    (2006.01)
  *H02G 3/22*    (2006.01)

(52) U.S. Cl.
  CPC ... *F16L 5/06* (2013.01); *H02G 3/22* (2013.01)

(58) Field of Classification Search
  CPC .................................. F16L 5/06; H02G 3/22
  USPC .......... 174/655, 653; 439/460, 461, 584, 583, 439/587–589, 603; 285/369, 417; 411/269
  See application file for complete search history.

(56) References Cited

U.S. PATENT DOCUMENTS

| | | | | |
|---|---|---|---|---|
| 3,866,923 A | * | 2/1975 | Gorman | 277/576 |
| 4,960,342 A | * | 10/1990 | Chi | 403/24 |
| 7,354,309 B2 | * | 4/2008 | Palinkas | 439/588 |
| 7,735,876 B2 | * | 6/2010 | Chiu | 285/207 |
| 2006/0134979 A1 | * | 6/2006 | Henningsen | 439/583 |
| 2011/0070766 A1 | * | 3/2011 | Lindkamp et al. | 439/462 |
| 2011/0226084 A1 | * | 9/2011 | Chiou | 74/502.4 |
| 2012/0038142 A1 | * | 2/2012 | Legrand et al. | 285/14 |

FOREIGN PATENT DOCUMENTS

| | | |
|---|---|---|
| DE | 102006043217 B3 | 3/2008 |
| DE | 102007017918 A1 | 10/2008 |
| EP | 1675244 B1 | 6/2005 |
| EP | 1898506 B1 | 7/2007 |

* cited by examiner

*Primary Examiner* — Michael P Ferguson
*Assistant Examiner* — Jay R Ripley
(74) *Attorney, Agent, or Firm* — Fraser Clemens Martin & Miller LLC; William J. Clemens (57) ABSTRACT

A device for a sealed feed-through of an elongated part through an opening in a mounting wall includes a hollow cylindrical tubular fitting connectable to the mounting wall and having a fitting channel for the elongated part and a first outer thread, a cap nut with a feed-through opening for the elongated part and an inner cap thread that is connected to the first outer thread, and a sealing member arranged within the cap nut and having a receiving channel for the elongated part. The tubular fitting includes, adjacent the first outer thread, a cylindrical sealing wall and the cap nut includes, adjacent to the inner cap thread, a closing flange that holds an elastic sealing ring that rests tightly sealing on the sealing wall and which is axially movable along the sealing wall when the cap nut is turned relative to the tubular fitting.

18 Claims, 7 Drawing Sheets

FEED-THROUGH DEVICE

FIELD OF THE INVENTION

The present invention relates to a device for the sealed feed-through of elongated parts through an opening of a mounting wall.

BACKGROUND OF THE INVENTION

For guiding media, such as liquids, gases or electricity, elongated parts, such as hoses, tubes or cables are used, which often need to be guided through a wall opening, e.g. through the opening of a housing of an electrical device.

In the chemical industry, the pharmaceutical industry and the food industry strict requirements are prescribed with regard to the cleanness of production facilities and all their components. Thereby it is important that openings, through which elongated parts are guided, are tightly sealed. Further, feed-through devices shall not suffer from contamination or corrosion and shall not require extensive cleaning or maintenance.

In patent document EP1898506B1 (corresponding to DE102006043217B3), a feed-through device is known, that comprises a hollow cylindrical tubular fitting, which can be connected to a housing wall and that comprises an outer thread, on which a cap nut is mounted that is provided with an inner thread. With the cap nut a hollow cylindrical pressure element and an annular sealing element can be pressed against an elongated part that is guided through the tubular fitting.

According to EP1898506B1, the problem with such feed-through devices existed, that even after completely setting up a cap nut on the tubular fitting, a part of the outer thread of the tubular fitting remained exposed to the outside. Hence, this part of the outer threat could still get contaminated by dirt, wherefore the strict requirement of cleanness often could not be met.

In EP1898506B1, it is further explained that the outer thread of the tubular fitting of known feed-through devices cannot be manufactured with such a low number of convolutions of the outer thread that the cap nut in the installed state covers the outer thread completely in every configuration. Depending on the diameter of the elongated part guided through the feed-through device, the cap nut needs to be screw with more or less turns onto the tubular fitting, so that the pressure element and the sealing member can be pressed firmly and tightly against the elongated part. Hence, convolutions of the outer thread that are not covered are prone to contamination that can only be removed with considerable effort.

Hence, in EP1898506B1 it has been proposed to connect the cap nut of the feed-through device in such a way with the tubular fitting that the cap nut can be turned but cannot move axially against the tubular fitting and that the outer thread of the tubular fitting is completely covered. For this purpose the inner side of the cap nut comprises an inner thread that engages into an outer thread of a sliding element, which is arranged torque proof but slidable in the direction of the longitudinal axis of the tubular fitting. Hence, in this embodiment of the feed-through device, instead of the cap nut the sliding element is used as pressure element.

For connection purposes, the cap nut is brought from the outside onto the tubular fitting and is coupled by means of a snap on connection with the tubular fitting. Hence, the tubular fitting can be manufactured without an outer thread, wherefore the leading cause for contamination of the outside of the tubular fitting has fallen away.

For mounting the cap nut it is proposed, to insert a plastic ring into an annular groove provided on the outside of the tubular fitting, which plastic ring is pressed radially inwards when the cap nut is set up. Hence, in this embodiment additional device parts are required, which need to be manufactured and assembled with considerable effort. If the cap nut shall securely be held, then the plastic ring must be provided in massive form. However, in this case, considerable force is required to compress the plastic ring for setting-up the cap nut on the tubular fitting. However, if the plastic ring is designed with reduced dimensions, then the resulting connection may not be as reliable as required. Further, the plastic ring is under a load, which can lead to its destruction. Still further, the plastic ring has no sealing property, wherefore an additional sealing ring must be applied, which is exposed to mechanical stress when the cap nut is turned. Furthermore, the sliding element, which is slidably held within the cap nut, needs to be supported accordingly, so that it will not be blocked when handling the device.

In total a complex solution results with numerous device parts, that need to be manufactured, assembled and operated with corresponding effort and that are exposed to considerable stress.

In patent document EP1675244B1, a feed-through device is disclosed, that comprises a tubular fitting, a cap nut screwed onto the tubular fitting as well as a sealing and pressure member arranged between the tubular fitting and the cap nut, which sealing and pressure member consists of a single part, namely an elastic sealing insert. Also with this feed-through device a part of the outer thread of the tubular fitting can get freely exposed, particularly then, when an elongated part is installed that comprises a larger diameter. Furthermore, the threaded connection between the tubular fitting and the cap nut is not optimally sealed.

The present invention is based on the object of providing an improved feed-through device that allows sealed feed-through of elongated parts through opening of a wall, e.g. through a wall of a housing.

Particularly, a feed-through device shall be created, which can receive and sealingly embrace elongated parts with different diameters, thus providing a reliable sealing.

The feed-through device shall have a compact construction and shall exhibit smooth external surfaces, on which contamination can scarcely settle and which can be cleaned with little effort. Particularly, it shall be avoided that a part of a thread is exposed to the outside.

Furthermore, the feed-through device shall be created cost-efficient with a simple design and with the lowest possible number of device parts.

Still further, the feed-through device shall easily be operable and shall not be exposed to grow and stresses during operation, so that wearing is avoided. More particularly, only robust device elements shall be used that can be exposed to higher mechanical stresses, so that a robust construction results.

BRIEF SUMMARY OF THE INVENTION

The device, which serves for a sealed feed-through of an elongated part, a tube, a hose or a cable, through an opening in a mounting wall, comprises: a) a hollow cylindrical tubular fitting that is connectable to the mounting wall and that comprises a fitting channel and a first outer thread; b) a cap nut with a feed-through opening and with an inner cap thread that is connected to the first outer thread of the tubular fitting, as well as; c) a sealing member that is arranged within the cap nut and that comprises a receiving channel.

According to the invention, the tubular fitting comprises, neighboring to the first outer thread, a cylindrical sealing wall and the cap nut comprises, neighboring to the inner cap thread, a closing flange that holds an elastic sealing ring, which rests tightly sealing on the sealing wall and which is axially movable along the sealing wall, when the cap nut is turned.

After the installation of the feed-through device, the sealing ring is always sealingly seated on the cylindrical sealing wall, which corresponds to the outside of a hollow cylindrical part of the tubular fitting or the outside of a sealing sleeve mounted on the tubular fitting. At the same time the sealing ring is sealingly connected to the cap nut, wherefore the area between the cap nut and the tubular fitting is completely sealed.

The optional use of a sealing sleeve allows the efficient application of high-grade materials, such as high-quality metals. Instead of manufacturing the complete voluminous tubular fitting from high-grade material, only the sealing sleeve is made from high-grade material. The sealing sleeve can be connected to the tubular fitting for example by means of corresponding threads. In the event that the tubular fitting itself is made from high-grade material, then a sealing sleeve is not required.

The wall height of the sealing wall, i.e. the corresponding width of the cylindrical area of the tubular fitting, along which the sealing ring can be sliding, is selected according to the length of the inner thread of the cap nut. Hence, the sealing ring is sealingly seated on the sealing wall in all possible adjustments of the cap nut. The length of the closing flange and the length of the sealing ring are selected in such a way, that the first outer thread of the tubular fitting is always completely covered by the combination of the closing flange and the sealing ring with all possible adjustments of the cap nut. The closing flange can form a relatively long cylinder segment, which holds and preferably completely embraces a relatively short sealing ring. Alternatively, only a short closing flange can be provided, which holds a sealing ring that forms a longer cylinder segment. Hence, the closing flange and the sealing ring form longer or shorter ring elements, particularly ring flanges or cylinder segments, which complement one another, in order to completely bridge the first outer thread and to ensure that the sealing ring remains always sealingly seated on the cylindrical sealing wall.

Hence, the transition region between the cap nut or the closing flange of the cap nut, respectively, on the one hand and the tubular fitting or the sealing wall, respectively, on the other hand is always sealingly closed by the sealing ring. Independently from the diameter of the installed elongated part and the related adjustment or position of the cap nut, the outer thread of the tubular fitting is always completely covered, so that that no contamination can appear therein.

The sealing ring comprises a ring body that preferably is designed hollow cylindrically and that preferably comprises at least one mounting element. Preferably, the ring body comprises a first outer annular flange on the side facing the cap nut, which first outer annular flange engages in an inner annular groove that is provided on the inner side of the closing flange.

In a further preferred embodiment, the ring body comprises a second outer annular flange on the side distal to the cap nut, which outer annular flange is seated at the lower side of the closing flange on an inner annular flange, which preferably is delimited by the inner annular groove. Hence, at one side of the inner annular flange the first outer annular flange is seated and on the other side of the inner annular flange the second outer annular flange of the sealing ring is seated. The inner annular flange provided on the closing flange preferably presses against the ring body of the sealing ring, wherefore a form locking connection results between the closing flange and the sealing ring that is sealingly closed in several annular regions. In addition the sealing ring is pressed against the closing flange, when the sealing ring is sealingly seated on the sealing wall.

Due to its elasticity, the sealing ring can be shifted into the closing flange of the cap nut. In order to facilitate this process, the first outer annular flange of the sealing ring and the inner annular flange of the closing flange preferably comprise wedge-shaped cross-sections and conically formed annular wedge planes aligned in parallel to one another, so that the closing flange can be set up onto the sealing ring and can be shifted against the sealing ring until the first outer flange of the sealing ring snaps into the inner annular groove provided in the closing flange.

The second outer flange of the sealing ring is preferably directed upwards and provided with a hook-shape, so that the second outer flange, when the sealing ring is inserted, can be grasped by the inner annular flange of the closing flange and can be bent outwards, so that the first outer annular flange is drawn in addition against the inner annular flange of the closing flange. Consequently, a form-locking and a force-locking connection result between the closing flange and the sealing ring.

In a further preferred embodiment the ring body of the sealing ring comprises an annular sealing lip on the side distal to the cap nut, which annular sealing lip is directed towards the sealing wall of the tubular fitting and which annular sealing lip forms a circle with a diameter, which is smaller than the diameter of the cylindrical sealing wall and which diameter is preferably smaller than in the inner diameter of the ring body of the sealing ring. The elastic sealing lip embraces the cylindrical sealing wall and is seated with a pressing force on the cylindrical sealing wall, wherefore a tight force-locking connection results between the sealing lip and the cylindrical sealing wall. The sealing ring, which comprises the ring body, the two outer flanges and the sealing lip is preferably manufactured in one piece and is made from a material, which exhibits an elasticity that allows, on the one hand, to press the sealing ring into the closing flange of the cap nut and on the other hand to stretch and expand the sealing lip so that it can be guided over the cylindrical sealing wall.

In a preferred embodiment, a transition region, preferably a rounded shoulder is provided between the first outer thread and the cylindrical sealing wall of the tubular fitting, which transition region narrows towards the first outer thread and broadens towards the cylindrical sealing wall. Hence, the sealing lip can be guided towards the rounded shoulder, i.e. the transition region, and can be expanded when moving along the transition region, until the sealing lip reaches the height of the sealing wall and can be moved along the sealing wall. The preferably rounded transition region allows transferring the sealing lip into the operation region of operation without effort and without any risk and wearing, wherefore damaging of the sealing lip is avoided.

Preferably, the tubular fitting, the cap nut and the sealing ring are dimensioned in such a way that the engagement of the first outer thread of the tubular fitting into the inner thread the cap nut occurs, before the sealing lip has reached the transition region. Hence, the movement of the sealing lip along the transition region can be done practically without effort by turning the cap nut. Thereby, the inner diameter of the sealing ring is larger than the diameter of the first outer thread of the tubular fitting, so that the sealing ring can be guided over the outer thread of the tubular fitting up to the transition region.

The sealing ring preferably consists of a plastic that is resistant to mechanical stresses and influences of chemical substances and that at the same time comprises the required elasticity that allows expansion of the sealing lip and compression of the first outer flange. Preferably, the plastic material has an elasticity modulus in the range of 350 MPa up to 1000 MPa or higher, preferably approximately 420 MPa. Further, the plastic shall exhibit good gliding properties which ensure, that the sealing lip can be guided with little force along the cylindrical sealing wall in spite of the preferably high elasticity modulus and the tight seating. Preferably the sealing ring is made from polytetrafluoroethylene PTFE that is resistant to mechanical stresses and chemical influences and that exhibits optimal gliding properties.

The sealing member provided within the cap nut can be a single element, which is compressible and on the one side pressed against the inner wall of the cap nut and the other side pressed against the elongated part when the cap nut is fastened. In order to develop the required pressure for compressing the sealing member when fastening the cap nut and to advantageously form the sealing member, the cap nut is provided with an end piece comprising a dome-shaped or conically-shaped inner wall, which is provided with a feed-through opening concentrically to the longitudinal axis of the feed-through device.

In a preferred embodiment, a clamping collet is provided within the tubular fitting, which comprises a collet channel for feeding-through the elongated part and which comprises a lamella crown that is preferably held above the first outer thread of the tubular fitting within the cap nut. Within the lamella crown the hollow cylindrical sealing member is seated. When fastening the cap nut the lamellae are pressed against the sealing member, whereby the sealing member gets compressed and pressed against the installed elongated part. Preferably, the sealing member extends beyond the lamella crown, so that the sealing member is abutting in the range of the feed-through opening on the one hand directly the dome-shaped or conically-shaped inner wall of the end piece of the cap nut and on the one hand the installed elongated part. Preferably, the clamping collet is made from bendable material, e.g. hard elastic plastic with an elasticity modulus of 800 MPa or higher.

The sealing member is preferably made from a soft elastic material and preferably comprises an elasticity modulus in the range of 10 MPa up to 200 MPa. The sealing member is preferably made of caoutchouc, such as silicone rubber or fluororubber.

The clamping collet is preferably held torque proof within the tubular fitting, so that mutual movements of the device parts and corresponding wearing are avoided. Therefore, preferably a mounting flange provided within the fitting channel that comprises at least one guiding groove aligned in parallel to the longitudinal axis of the feed-through device. In the guiding groove a guiding fin is guided that is provided on the clamping collet. The guiding fin is preferably provided on a mounting cylinder, which supports a collet ring that is connected to the lamellae. The collet ring radially extends beyond the mounting cylinder and is seated on a mounting flange of the tubular fitting.

On the inner side, the mounting cylinder preferably comprises an inner shoulder, on which the hollow cylindrical sealing member is supported. Preferably the inner shoulder is formed as a wedge that is directed against the sealing member, so that the sealing member is securely held. Across the wedge shape a larger sealing area results, against which the sealing member is pressed.

The tubular fitting can be installed in a conventional manner within an opening of a mounting wall. E.g., the tubular fitting is provided with a second outer thread and with an outer mounting flange that is arranged between the first and the second outer thread. The second outer thread can be guided through the opening in the mounting wall and can be fixed with a mounting nut. On the side facing the second outer thread the outer mounting flange preferably comprises an annular groove, into which an annular sealing element is engaged that seals the connection between the tubular fitting and the mounting wall sealed. In the event that the wall opening is provided with a thread the mounting nut is not required.

In order to avoid corrosion on the feed-through device, the tubular fitting, the cap nut and, if provided, the mounting nut are preferably made of high quality steel. However, it is also possible to produce these parts from high-quality plastic.

BRIEF DESCRIPTION OF THE SEVERAL VIEWS OF THE DRAWING

Some of the objects and advantages of the present invention have been stated, others will appear when the following description is considered together with the accompanying drawings, in which.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
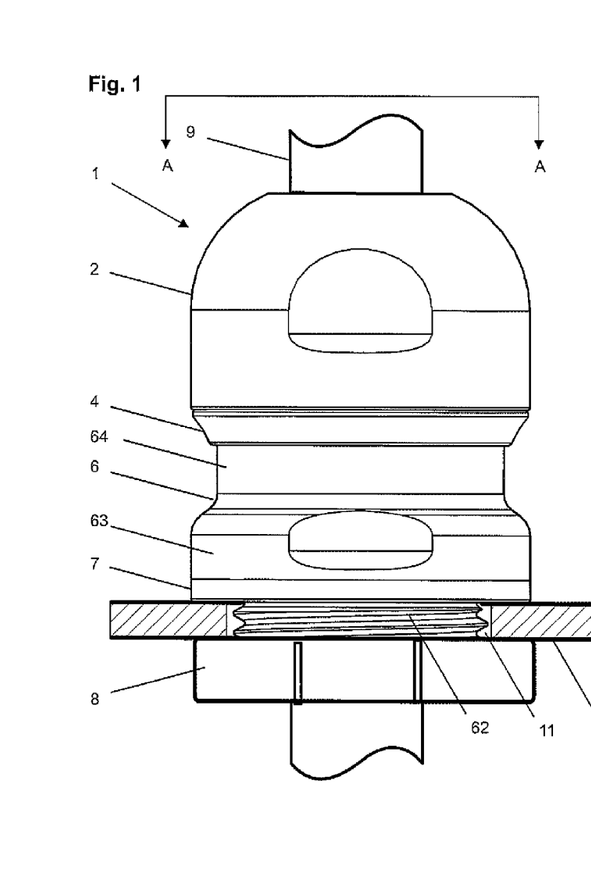
FIG. 1 shows an inventive feed-through device mounted in an opening of a mounting wall.

FIG. 1 shows an inventive feed-through device 1 with a tubular fitting 6, which comprises a first outer thread 61 (see FIG. 2), on which a cap nut 2 is seated, and which comprises a second outer thread 62 that is extending through a wall opening 11 in a mounting wall 10 and that is connected with a mounting nut 8. Inside the feed-through device 1 an elongated part 9, e.g. a tube or a cable is held, which is extending through the wall opening 11 (see FIG. 5).

FIG. 1 shows further, that the cap nut 2 on the front side holds an elastic sealing ring 4, which encloses and abuts a hollow cylindrical middle member of the tubular fitting 6, whose outer wall forms a sealing wall 64, along which the sealing ring 4 is slidable.

The tubular fitting 6 further comprises an outer mounting flange 63, on which an annular sealing element 7 is seated that is sealing the area between the outer mounting flange 63 and the mounting wall 10.

FIG. 1 shows that the feed-through device 1 exhibits a compact design and essentially smooth outer surfaces, which can easily be cleaned. The tubular fitting 6, the mounting nut 8 and the cap nut 2 are preferably made of high-quality steel, so that corrosion is avoided. The sealing ring 4 is preferably made of a robust, hard-elastic material, such as polytetrafluorethylene PTFE, which exhibits good gliding properties. Even after extended use and numerous manipulations, particularly movements of the sealing ring 4 along the sealing wall 64, signs of wearing will scarcely appear. The annular sealing element 7, which is exposed to reduced mechanical stress compared to the sealing ring 4, is preferably made from soft-elastic material, such as caoutchouc, particularly silicone rubber or fluororubber.

In order to allow grasping the tubular fitting 6 and the cap nut 2 with tools in a form-locking manner, the tubular fitting 6 and the cap nut 2 are preferably provided with recesses.

Figure 2:
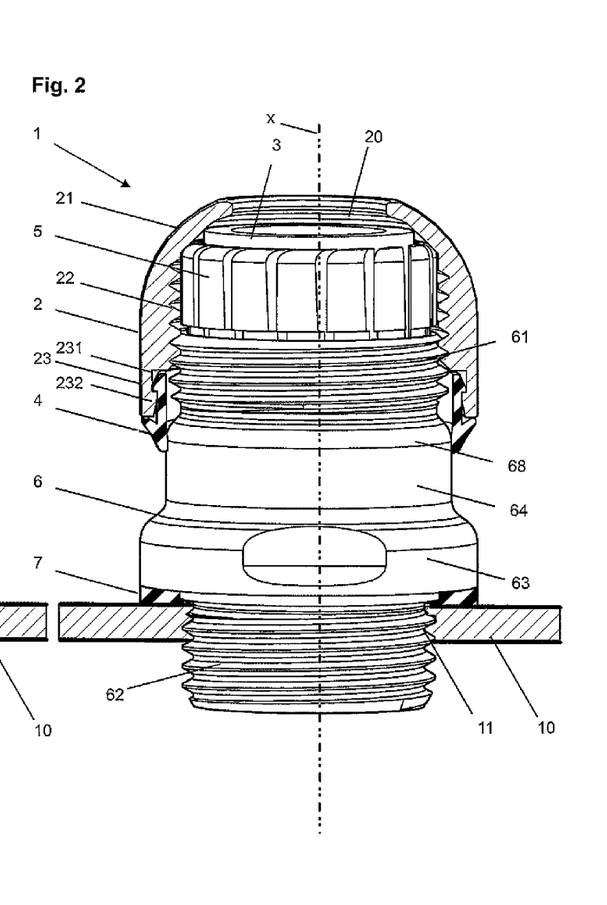
FIG. 2 shows the feed-through device in a cross-sectional view along the cutting line A-A shown in FIG. 1.

FIG. 2 shows the feed-through device 1 of FIG. 1 with a cut through the cap nut 2, the sealing ring 4 and the annular sealing element 7 along the cutting line A-A shown in FIG. 1. In this view, the second outer thread is inserted into the wall opening 11 of the mounting wall 10 that comprises a thread in which the second outer thread is engaged. Hence, a mounting nut is not required in this case.

The cap nut 2 comprises at the upper end an end piece 21 with a feed-through opening 20, inside an inner cap thread 22 and at the lower end a closing flange 23 facing the tubular fitting 6. The closing flange 23 comprises an inner annular groove 231 and adjacent thereto an inner annular flange 232. The closing flange 23 is connected in a form-locking and preferably also in a force-locking manner to the sealing ring 4 that is inserted therein.

Further, a clamping collet 5 with lamellae is seated within the tubular fitting 6, which extend above beyond the first outer thread 61 and which abut with their front side the end piece 21 of the cap nut 2, which comprises a dome-shaped or conically-shaped inner wall. Within the clamping collet 5 a sealing member 3 is held, which extends beyond the lamellae and which also abuts with the front side the inner wall of the end piece 21 of the cap nut 2. When fastening the cap nut 2, the end piece 21 of the cap nut 2 presses the lamellae and the sealing member 3 radially inside until the sealing member 3 sealingly embraces the installed elongated part 9. Subsequently, the sealing member 3 adjoins on one side sealingly the inner wall of the cap nut 2 and on the other side the elongated part 9, so that an optimal sealing results on both sides.

FIG. 2 further shows, that the inner diameter of the cylindrical closing flange 23 is larger than the inner diameter of the inner cap thread 22 of the cap nut 2. Hence, the sealing ring 4 is radially extending farther to the outside compared to the inner cap thread 22 and can therefore be shifted over the first outer thread 61 of the tubular fitting 6 up to a transition region 68. The transition region 68 forms a shoulder that extends radially outside towards the sealing wall 64. The shoulder is rounded, so that the sealing ring 4 can be moved across without additional resistance. Before the sealing ring 4 reaches the transition region 68, the inner cap thread 22 of the cap nut 2 preferably engages the first outer thread 61 of the tubular fitting 6, whereafter the movement of the sealing ring 4 across the transition region 68 is performed automatically when the cap nut 2 is fastened. Hence, at first, the sealing ring 4 is connected to the cap nut 2 and so that it can then be guided easily across the transition region 68, by turning the cap nut 2.

While the sealing ring 4 is moved across the transition region 68, the sealing ring 4 is continuously stretched and expanded, so that it then tightly encloses the sealing wall 64 in a force-locking manner. It is shown, that the height wh (FIG. 7) of the sealing wall 64 is selected in such a way, that the sealing ring 4 abuts the sealing wall 64 in all positions of the cap nut 2 that can occur when elongated parts 9 with different diameters are mounted.

Figure 3:
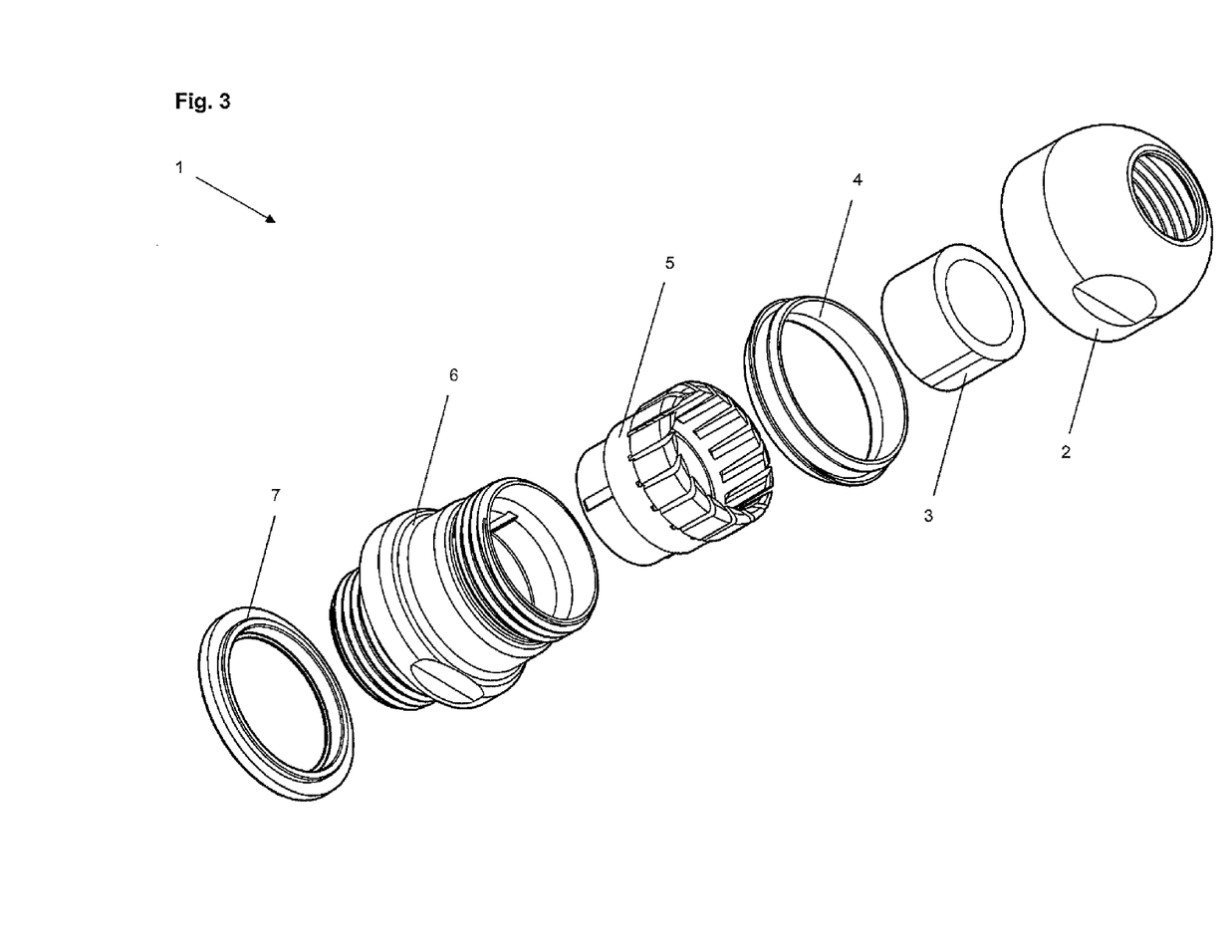
FIG. 3 shows the feed-through device of FIG. 1 in an exploded perspective view.

FIG. 3 shows the feed-through device 1 of FIG. 1 in an exploded view with the cap nut 2, the sealing member 3, the sealing ring 4, the clamping collet 5, the tubular fitting 6 and the annular sealing element 7 in coaxial alignment towards one another.

Figure 4:
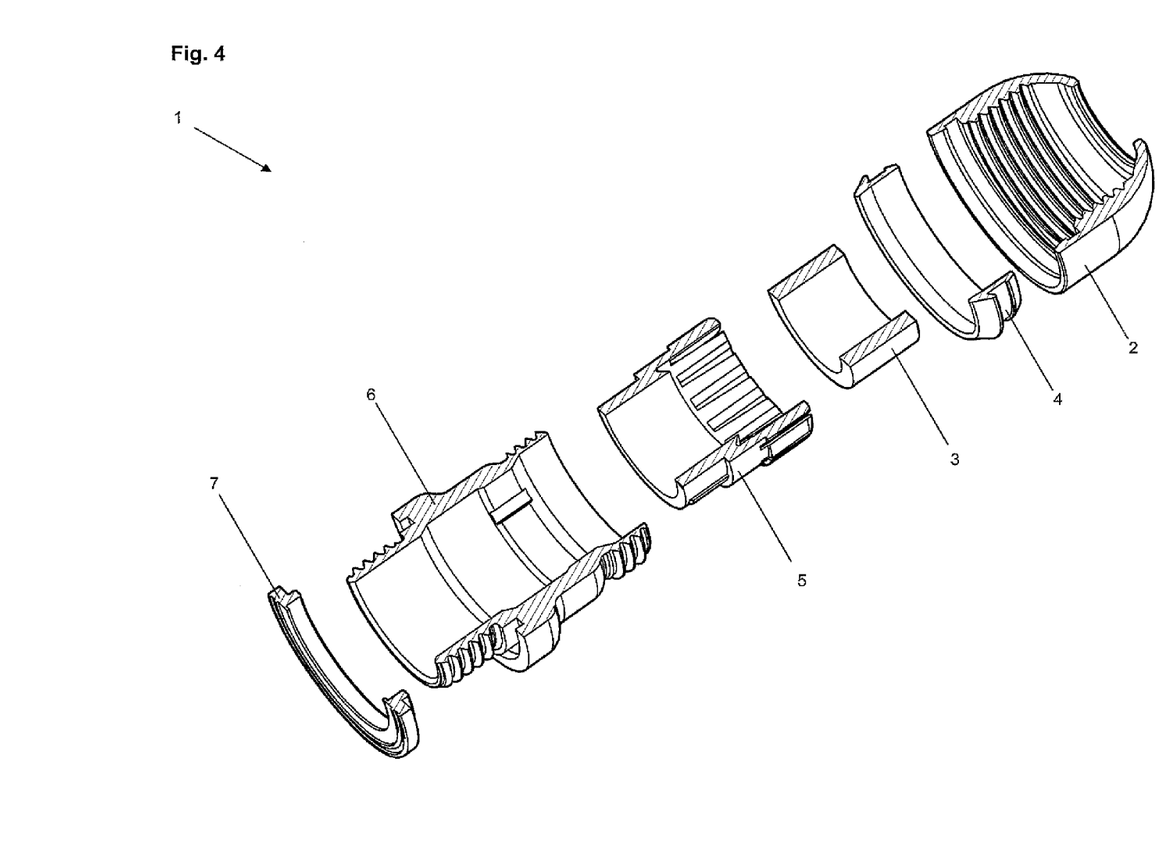
FIG. 4 shows a cross-sectional view of the feed-through device along the cutting line A-A shown in FIG. 1 with the device elements separated from one another.

FIG. 4 shows a cross-sectional view of the feed-through device 1 along the cutting line A-A shown in FIG. 1 with the device elements separated from one another.

Figure 5:
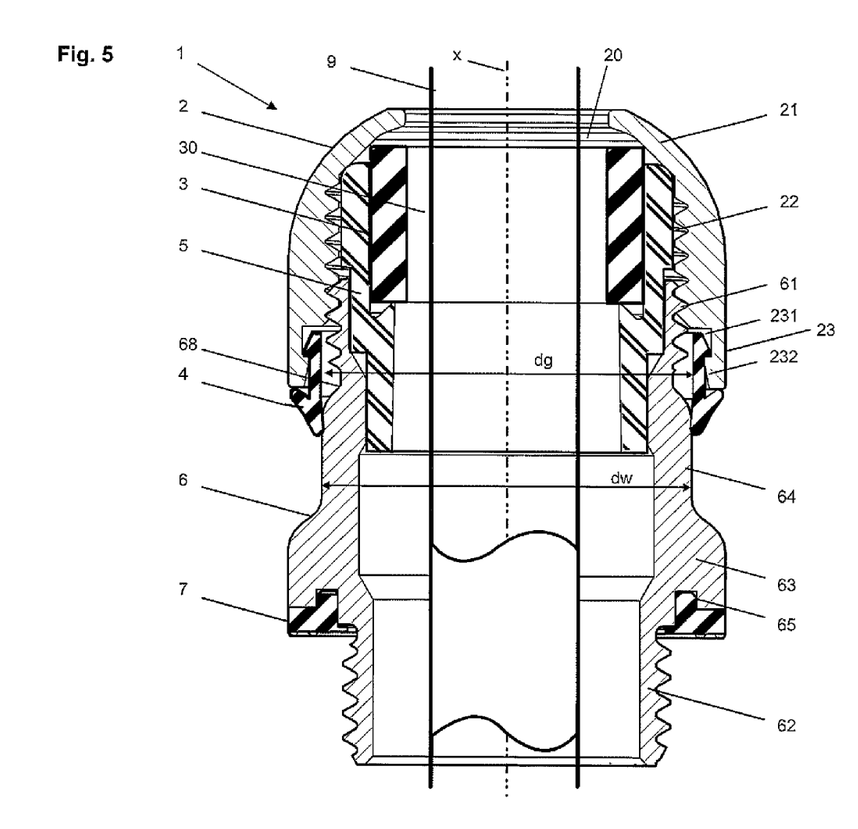
FIG. 5 shows the assembled feed-through device with all device elements in cross-sectional view along the cutting line A-A shown in FIG. 1.

FIG. 5 shows the assembled feed-through device 1 with all device elements in cross-sectional view along the cutting line A-A shown in FIG. 1. The elastic sealing member 3, which is formed hollow cylindrically and which comprises a receiving channel 30, the sealing ring 4 and the annular sealing element 7 are shown hatched with broad lines to highlight the elastic properties of these parts. The lamellae of the clamping collet 5, which are bendable, are shown hatched with broader doubled lines.

Figure 9:
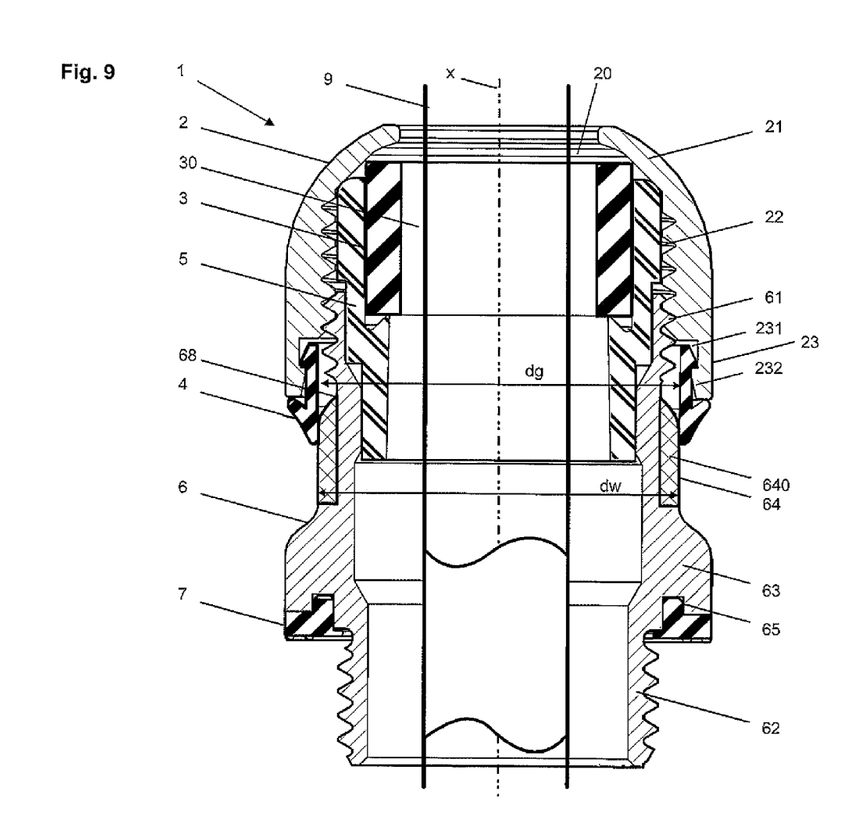
FIG. 9 shows a cross-sectional view similar to FIG. 5 of an alternate embodiment feed-through device.

In the configuration of FIG. 5, the front side of the sealing ring 4 has already been pushed over the transition region 88 and is tightly and sealingly seated on the sealing wall 64. It is shown that the diameter dw of the cylindrical sealing wall 84 is lamer than the diameter dg of the first outer thread 81 of the tubular fitting 8. Hence, the transition region 68 lying therebetween is expanding radially outside from the first outer thread 61 towards the sealing wall 64. FIG. 9 shows an alternate configuration wherein a jacket sleeve 640 is mounted on the tubular fitting 6 to form the cylindrical sealing wall 64 and the transition region 68.

It is further shown that the outer mounting flange 63 comprises an annular groove 65 that is opened downwards and in which the annular sealing element 7 is engaged.

Figure 6:
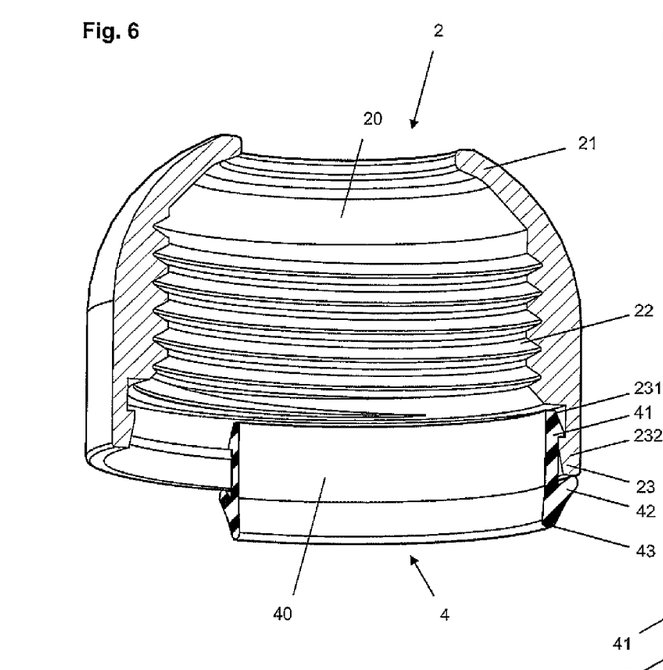
FIG. 6 shows a cross-sectional view of the cap nut along the cutting line A-A shown in FIG. 1.

FIG. 6 shows a cross-sectional view of the cap nut 2 along the cutting line A-A shown in FIG. 1 with an inner annular groove 231, in which the sealing ring 4 is held. The cap nut 2 comprises the closing flange 23 which forms a cylinder segment that is aligned at least approximately coaxially to the longitudinal axis x of the feed-through device 1. The closing flange 23 comprises on the inner side an inner annular groove 231 and adjacent thereto an inner annular flange 232.

The sealing ring 4 comprises a ring body 40 with a first outer annular flange 41 that is extending outside on the upper end and engages into the inner annular groove 231 provided in the closing flange 23. At the lower side the ring body 40 comprises a second outer annular flange 42 that is extending towards the outside and that, slightly inclined towards above, is abutting the lower side of the closing flange 23. The first and the second outer annular flange 41, 42 therefore enclose the inner annular flange 232 and abut the inner annular flange 232 in a force-locking manner.

The first outer annular flange 41 of the sealing ring 4 and the inner annular flange 232 provided on the closing flange 23 of the cap nut 2 are wedge-shaped and exhibit conically formed wedge planes that are aligned at least approximately in parallel to one another. Due to the wedge-shape of the outer annular flange 41 and the inner annular flange 232, the sealing ring 4 can easily be shifted into the cap nut 2.

At the lower side, the ring body 40 is further provided with an annular sealing lip 43, which in this preferred embodiment forms an annular lever together with the second outer annular flange 42, which abuts the lower side of the closing flange 23 thus supporting the sealing lip 43.

Figure 6A:
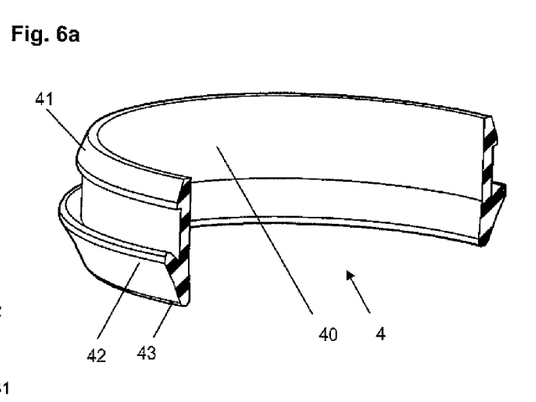
FIG. 6a shows a cross-sectional view of the sealing ring along the cutting line A-A shown in FIG. 1.

FIG. 6a shows a cross-sectional view of the sealing ring 4 along the cutting line A-A shown in FIG. 1.

Figure 6B:
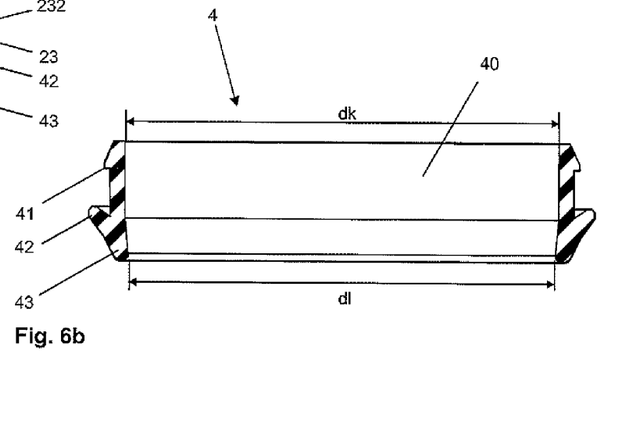
FIG. 6b shows a cross-sectional view of the sealing ring along the cutting line A-A shown in FIG. 1 from a different angle.

FIG. 6b shows a cross-sectional view of the sealing ring 4 along the cutting line A-A shown in FIG. 1 from a different angle. It is shown that the inner diameter dk of the ring body 40 is larger than the inner diameter dl of the annular sealing lip 43, which is inclined towards the inside against the sealing wall 64 (see FIG. 7). Hence, the front side of the sealing lip 43 can abut the sealing wall 64, while the ring body 40 is kept in a distance therefrom.

Figure 7:
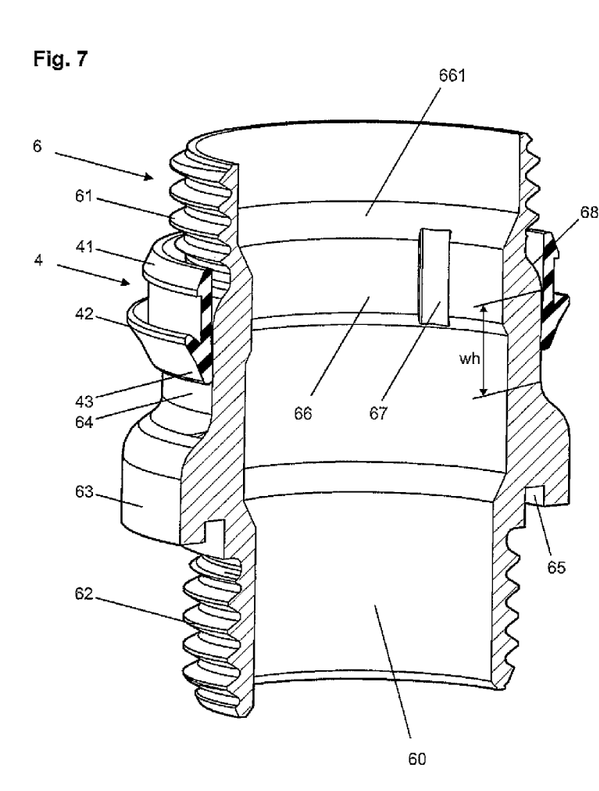
FIG. 7 shows a cross-sectional view along the cutting line A-A shown in FIG. 1 of the tubular fitting and the sealing ring.

FIG. 7 shows a cross-sectional view along the cutting line A-A shown in FIG. 1 of the tubular fitting 6 and the sealing ring 4, which is tightly seated on the cylindrical sealing wall 64 of the tubular fitting 6 and is slidable along this sealing wall 64. Compared to the illustration of FIG. 5, the sealing ring 4 is moved downwards and still abuts tightly sealing the cylindrical sealing wall 64. The sealing ring 4 is movable along the wall height wh of the sealing wall 64, which preferably corresponds to the height of the first outer thread 61 of the tubular fitting 6 or is even larger.

Figure 8A:
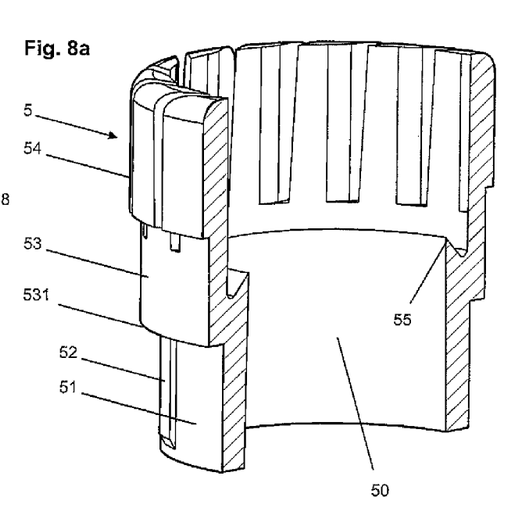
FIG. 8a shows a cross-sectional view of the clamping collet along the cutting line A-A shown in FIG. 1.

Within the tubular fitting 6 is formed a fitting channel 60, for receiving the elongated part 9, in which an inner mounting flange 66 is provided, which exhibits a supporting area 661 on the upper side, on which the collet ring 53 of the clamping collet 5 shown in FIG. 8a can be seated. The inner mounting flange 66 further comprises one or a plurality of guiding grooves 67, which are aligned in parallel to the longitudinal axis x of the feed-through device 1.

FIG. 8a shows a cross-sectional view of the clamping collet 5 along the cutting line A-A shown in FIG. 1. The clamping collet 5 comprises a mounting cylinder 51 equipped with guiding fins 52. Above the mounting cylinder 51 and adjacent thereto a collet ring 53 is provided extending radially outwards. The collet ring 53 is provided with bendable lamellae 541, 542, 543, ... (see FIG. 8b), which form a lamella crown 54. On the upper side the mounting cylinder 51 further exhibits an inner shoulder 55 that is formed as an annular wedge that is directed upwards towards the collet channel 50 serving as a seat for the sealing element 3 (see FIG. 5).

The clamping collet 5 is inserted into the tubular fitting 6, by aligning the mounting cylinder 51 with the guiding fins 52 with the guiding grooves 67 of the mounting flange 66 and inserting the mounting cylinder 51 into the inner mounting flange 66 until the annular shoulder 531 formed by the collet ring 53 abuts the upper side 661 of the inner mounting flange 66. Subsequently the clamping collet 5 is held torque proof by the inner mounting flange 66. The lamellae 541, 542, 543, extend beyond the first outer thread 61 of the tubular fitting 6 and abut the inner wall of the cap nut 2.

Figure 8B:
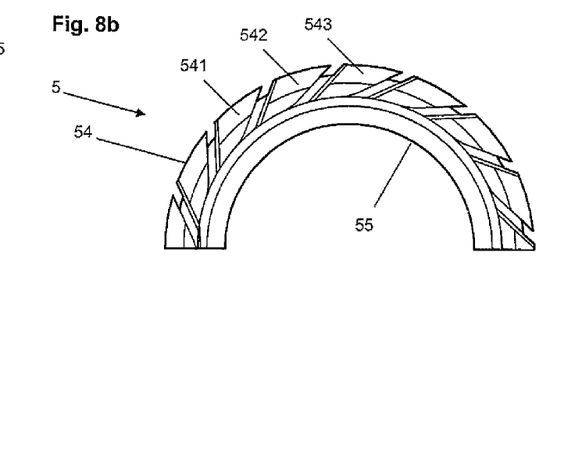
FIG. 8b shows a cross-sectional view of the clamping collet along the cutting line A-A shown in FIG. 1 from a different angle.

FIG. 8b shows a cross-sectional view of the clamping collet 5 along the cutting line A-A shown in FIG. 1 from a different angle. It is shown that the lamellae 541, 542, 543 are horizontally inclined beside one another and thus can be moved radially towards the inside, where they overlap one another.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A feed-through device for a sealed feed-through of an elongated part, a tube, a hose or a cable, through an opening in a mounting wall, comprising:
    a hollow cylindrical tubular fitting that is connectable to the mounting wall and has a fitting channel for receiving the elongated part and a first outer thread;
    a cap nut with a feed-through opening for receiving the elongated part and with an inner cap thread that is connected to the first outer thread of the tubular fitting;
    a sealing member arranged within the cap nut and having a receiving channel for receiving the elongated part, wherein the tubular fitting has, adjacent the first outer thread, a cylindrical sealing wall and wherein the cap nut has, adjacent the inner cap thread, a closing flange that holds an elastic sealing ring, the ring resting and tightly sealing on the sealing wall and the ring being axially movable along the sealing wall when the cap nut is turned relative to the tubular fitting;
    a clamping collet seated within the tubular fitting, the clamping collet having a collet channel for feed-through of the elongated part, and a lamella crown arranged within the cap nut above the first outer thread of the tubular fitting and that embraces the sealing member;
    wherein the tubular fitting has within the fitting channel an inner mounting flange with at least one guiding groove aligned parallel to a longitudinal axis of the tubular fitting and wherein the clamping collet has a mounting cylinder with a guiding fin on an outer side, the guiding fin being axially movable within the guiding groove;
    wherein the clamping collet has a collet ring arranged adjacent to and radially extending beyond the mounting cylinder, the collet ring supporting on one side the lamella crown and having on another side a rind shoulder that is seated on the inner mounting flange; and
    wherein a transition region is provided between the first outer thread and the cylindrical sealing wall, the cylindrical sealing wall having a larger diameter than a diameter of the first outer thread of the tubular fitting.

2. The feed-through device according to claim 1, wherein the transition region being formed by a middle part of the tubular fitting or by a jacket sleeve mounted on the tubular fitting, the transition region narrowing towards the first outer thread.

3. The feed-through device according to claim 1, wherein the sealing wall has a wall height that corresponds to a height of the inner cap thread of the cap nut, wherein the sealing ring rests on the sealing wall with any adjustments of the cap nut relative to the tubular fitting and a height of the closing flange and the wall height of the sealing ring are selected so that the first outer thread of the tubular fitting is always completely overlapped by the combination of the closing flange and the sealing ring with any adjustments of the cap nut relative to the tubular fitting.

4. The feed-through device according to claim 1, wherein the mounting cylinder has on an inner side of the collet ring an inner shoulder that supports the sealing member and has a wedge shape that is directed towards the sealing member.

5. The feed-through device according to claim 1, wherein the cap nut has an end piece concentric to a longitudinal axis of the tubular fitting with a feed-through opening therein for receiving the elongated part and adjacent the opening a dome-shaped or conically-shaped inner wall, and the sealing member overlaps the lamella crown wherein an upper end of the lamella crown and an upper end of the sealing member abut the inner wall of the end piece.

6. The feed-through device according to claim 1, wherein the tubular fitting has a second outer thread and an outer mounting flange between the first and the second outer threads, the outer mounting flange having, on a side facing the second outer thread, an annular groove in which an annular sealing element is held.

7. The feed-through device according to claim 1, wherein the sealing ring has an elasticity modulus in a range between 350 MPa and 1000 MPa and the sealing member has an elasticity modulus in a range between 10 MPa and 200 MPa.

8. The feed-through device according to claim 1, wherein the sealing member is made from a silicone rubber, a fluororubber or another caoutchouc material.

9. The feed-through device according to claim 1, wherein the sealing member is made from silicone rubber.

10. The feed-through device according to claim 1, wherein at least one of the tubular fitting and the cap nut is made from a plastic material.

11. The feed-through device according to claim 1, wherein at least one of the tubular fitting and the cap nut is made from a steel material.

12. The feed-through device according to claim 1, wherein the sealing ring has a ring body with an annular sealing lip located at a side distal of the cap nut, the sealing lip delimiting along a front side a circle with a diameter that is smaller than a diameter of the cylindrical sealing wall.

13. The feed-through device according to claim 12, wherein the ring body has a first outer annular flange on a side facing the cap nut, the first outer annular flange engaging in an inner annular groove provided in the closing flange of the cap nut.

14. The feed-through device according to claim 13, wherein the ring body has a second outer annular flange on the side distal of the cap nut, the second outer annular flange abutting a lower side of the closing flange on an Inner annular flange of the cap nut.

15. The feed-through device according to claim 1, wherein the sealing ring is made from an elastic plastic material resistant to mechanical stresses and chemical influences.

16. The feed-through device according to claim 15, wherein the sealing ring is made from a polytetrafluorethylene material.

17. A feed-through device for a sealed feed-through of an elongated part, a tube, a hose or a cable, through an opening in a mounting wall, comprising:
  a hollow cylindrical tubular fitting that is connectable to the mounting wall and has a fitting channel for receiving the elongated part and a first outer thread;
  a cap nut with a feed-through opening for receiving the elongated part and with an inner cap thread that is connected to the first outer thread of the tubular fitting;
  a sealing member arranged within the cap nut and having a receiving channel for receiving the elongated part, wherein the tubular fitting has, adjacent the first outer thread, a cylindrical seating wall and wherein the cap nut has, adjacent the inner cap thread, a closing flange that holds an elastic sealing ring, the ring resting and tightly sealing on the sealing wall and the ring being axially movable along the sealing wall when the cap nut is turned relative to the tubular fitting;
  a clamping collet seated within the tubular fitting, the clamping collet having a collet channel for feed-through of the elongated part, and a lamella crown arranged within the cap nut above the first outer thread of the tubular fitting and that embraces the sealing member;
  wherein the tubular fitting has within the fitting channel an inner mounting flange with at least one guiding groove aligned parallel to a longitudinal axis of the tubular fitting and wherein the clamping collet has a mounting cylinder with a guiding fin on an outer side, the guiding fin being axially movable within the guiding groove; and
  wherein the clamping collet has a collet ring arranged adjacent to and radially extending beyond the mounting cylinder, the collet ring supporting on one side the lamella crown and having on another side a ring shoulder that is seated on the inner mounting flange.

18. A feed-through device for a sealed feed-through of an elongated part, a tube, a hose or a cable, through an opening in a mounting wall, comprising:
  a hollow cylindrical tubular fitting that is connectable to the mounting wall and has a fitting channel for receiving the elongated part and a first outer thread;
  a cap nut with a feed-through opening for receiving the elongated part and with an inner cap thread that is connected to the first outer thread of the tubular fitting;
  a sealing member arranged within the cap nut and having a receiving channel for receiving the elongated part, wherein the tubular fitting has, adjacent the first outer thread, a cylindrical sealing wall and wherein the cap nut has, adjacent the inner cap thread, a closing flange that holds an elastic sealing ring, the ring resting and tightly sealing on the sealing wall and the ring being axially movable along the sealing wall when the cap nut is turned relative to the tubular fitting;
  a clamping collet seated within the tubular fitting, the clamping collet having a collet channel for feed-through of the elongated part, and a lamella crown arranged within the cap nut above the first outer thread of the tubular fitting and that embraces the sealing member;
  wherein the tubular fitting has within the fitting channel an Inner mounting flange with at least one guiding groove aligned parallel to a longitudinal axis of the tubular fitting and wherein the clamping collet has a mounting cylinder with a guiding fin on an outer side, the guiding fin being axially movable within the guiding groove;
  wherein the clamping collet has a collet ring arranged adjacent to and radially extending beyond the mounting cylinder, the collet ring supporting on one side the lamella crown and having on another side a ring shoulder that is seated on the inner mounting flange; and
  wherein the mounting cylinder has on an inner side of the collet ring an inner shoulder that supports the sealing member and has a wedge shape that is directed towards the sealing member.

* * * * *